United States Patent [19]
Eskeli

[11] 4,044,824
[45] Aug. 30, 1977

[54] HEAT EXCHANGER

[76] Inventor: Michael Eskeli, 7994-41 Locke Lee, Houston, Tex. 77042

[21] Appl. No.: 595,389

[22] Filed: July 14, 1975

Related U.S. Application Data

[63] Continuation-in-part of Ser. No. 537,067, Dec. 30, 1974, Pat. No. 3,931,713, and Ser. No. 591,881, June 30, 1975, abandoned.

[51] Int. Cl.² .............................................. F25B 3/00
[52] U.S. Cl. ....................................... 165/88; 60/682; 62/86; 62/401; 62/499
[58] Field of Search ................ 62/401, 403, 499, 86, 62/87, 402; 165/86, 88; 60/682

[56] References Cited

U.S. PATENT DOCUMENTS

| | | | |
|---|---|---|---|
| 1,030,203 | 6/1912 | Paulsen | 165/88 |
| 2,393,338 | 1/1946 | Roebuck | 62/499 |
| 2,451,873 | 10/1948 | Roebuck | 62/499 |
| 2,511,691 | 6/1950 | Bramley | 62/401 X |
| 2,522,781 | 9/1950 | Exner | 62/499 |
| 2,529,765 | 11/1950 | Exner | 62/499 |
| 2,729,073 | 1/1956 | Nielsen et al. | 62/402 |
| 3,470,704 | 10/1969 | Kantor | 62/499 X |
| 3,791,167 | 2/1974 | Eskeli | 62/401 |
| 3,949,557 | 4/1976 | Eskeli | 60/682 |

FOREIGN PATENT DOCUMENTS

| | | | |
|---|---|---|---|
| 26,184 | 11/1907 | United Kingdom | 165/86 |

*Primary Examiner*—Ronald H. Lazarus
*Assistant Examiner*—Sheldon Richter

[57] ABSTRACT

A method and apparatus for exchanging heat between two fluid streams, wherein the two fluids are passed in heat exchange relationship with each other within a rotating heat exchanger mounted on a shaft. The heat exchanger comprises a rotating housing, with the heat transfer elements mounted within, so that one of the fluid streams is passed through areas near the housing periphery, and the other fluid stream is passed through areas that are inward nearer to the axis of rotation from the housing periphery. The heat exchanger elements are made of heat conductive material and form bellows like pockets for the heat exchange to take place. Various vanes or other means may be provided to reduce tangential movement of the fluids, and thermal insulation layers may also be provided to prevent undesirable heat transfer. Fluids passing through the heat exchanger may be either gases or liquids.

5 Claims, 3 Drawing Figures

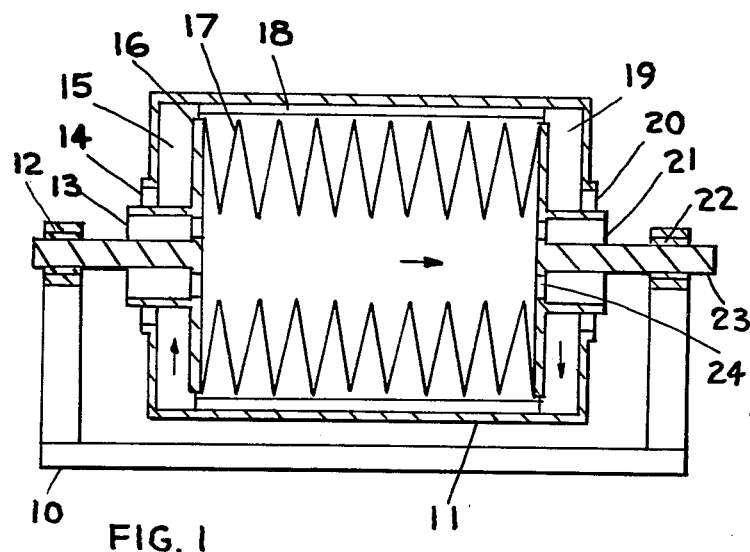
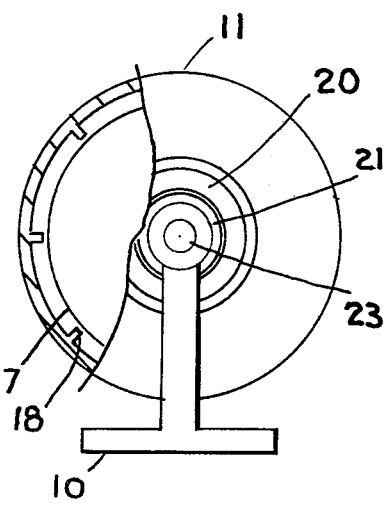
FIG. 1
FIG. 2
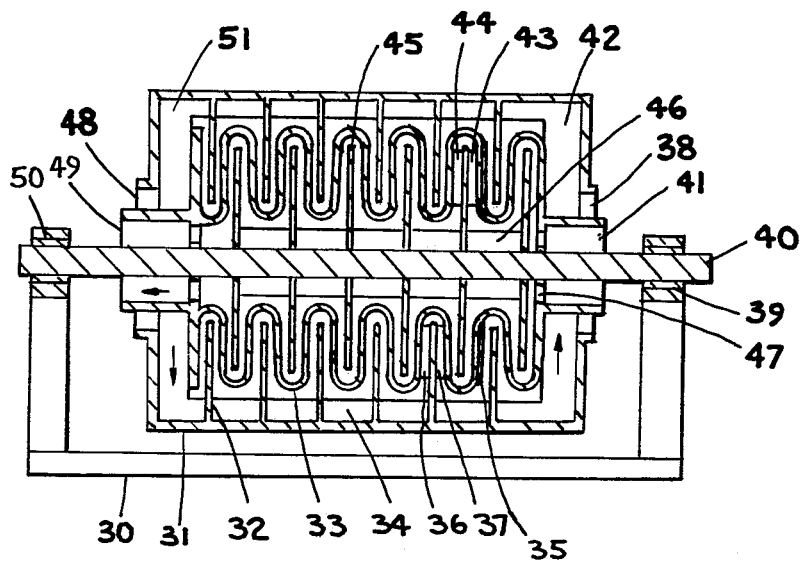
FIG. 3

HEAT EXCHANGER

CROSS REFERENCE TO RELATED APPLICATIONS

This application is a continuation-in-part application of "Turbine with Regenerator" filed Dec. 30, 1974 Ser. No. 537,067, now U.S. Pat. No. 3,931,713, and "Heat Pump", Filed on or about June 30, 1975, Ser. No. 591,881 now abandoned.

BACKGROUND OF THE INVENTION

This invention relates to heat exchangers of the type for exchanging heat primarily between two streams of fluids that are gaseous, and wherein the heat exchanger elements rotate to enhance heat transfer.

There have been various types of gas-to-gas heat exchangers in the past, where large surface areas have been provided for both fluids to effect necessary heat transfer. These heat exchangers are costly, due to the low heat transfer coefficients that gaseous fluids have, especially where the gas density is relatively low; also, such heat exchangers require a large volume to contain the necessary surface areas.

SUMMARY OF THE INVENTION:

It is an object of this invention to provide a heat exchanger wherein centrifugal force is employed to improve heat transfer between fluid streams, and particularly between two gaseous fluid streams. It is also an object to provide a heat exchanger wherein a large surface area with high thermal conductivity is contained within a relatively small volume thus reducing the cost of such heat exchanger. Also, by use of thermal insulation in suitable areas of the heat transfer elements, it is possible to improve the flow characteristics of the heat exchanger for the fluids passing through.

BRIEF DESCRIPTION OF THE DRAWINGS:

FIG. 1 is a cross section of a form of the heat exchanger, and

FIG. 2 is an end view of the unit shown in FIG. 1.

FIG. 3 is a cross section of a unit that is a modified form of the unit shown in FIG. 1.

DESCRIPTION OF PREFERRED EMBODIMENTS:

Referring to FIG. 1, therein is shown an axial cross section of the heat exchanger. 10 is base supporting bearings 12 and 22, and shaft 23. 11 is heat exchanger housing, which ordinarily is a circular cylinder, and first fluid stream enters via opening 20, passes between vanes 19, 18 and 15, and is discharged via opening 14. The second fluid enters via opening 13, passes through center space of rotor and exits via openings 24 and exit 21. 16 is an end support wall. Heat transfer occurs through heat conductive bellows-like elements 17.

In FIG. 2 an end view of the unit of FIG. 1 is illustrated. 11 is housing, 20 and 21 are fluid openings, 23 is shaft, 18 is longitudinal vane, 17 is heat transfer element, and 10 is support base.

In FIG. 3 another form of the unit is illustrated, which is similar to the unit of FIG. 1 with some modifications. 30 is base supporting bearings 39 and 50, and shaft 40. First fluid enters via opening 38, passes between vanes 42 and then passes through passages between bellows-like heat exchange members 33 and baffles 32, and then passes between vanes 51 and exits via opening 48. The second fluid enters via opening 49, passes between heat exchange members 33 and baffles 45, and then exits via openings 47 and exit 41. 34 are axial vanes near housing periphery, 46 are axial vanes near center, 43 and 44 are radial vanes in spaces between baffles 45 and heat exchange member 33, and 36 and 37 are vanes in spaces between heat exchange member 33 and baffles 33, and 35 is a typical layer of thermal insulation that may be applied primarily in the area shown in each bellow to enhance transport of each fluid in the indicated direction through the heat exchanger. If the fluid flow direction is changed, then the location of the thermal insulation also may be changed, or such insulation eliminated.

The operation of the heat exchanger is as indicated hereinbefore. Two fluid streams are passed through the heat exchanger, in heat exchange relationship with each other, and the heat exchanger is caused to rotate. Rotation of the heat exchanger is not mandatory, but such rotation improves the amount of heat transferred.

Referring to the unit of FIG. 1, the bellows like heat transfer elements are usually made such that the radial parts which are disc like, are closely together, with the spacing similar to that used for fins in finned tubing, for example. With such close spacing between the heat transfer elements, the first fluid, which is nearest to housing periphery, and which usually is the warmer fluid, fills the spaces between the heat transfer elements and by fluid friction is compelled to rotate with the heat exchanger. Since the colder second fluid is on the other side of the heat transfer element, first fluid is cooled, and due to density differentials, will be ejected from the space between said heat transfer elements 17, and being replaced by warmer fluid from the space between vanes 18, thus creating turbulence, and improving the amount of heat transfer. Similar conditions also prevail on the side occupied by the second fluid, where the second fluid is warmed by heat received from first fluid between the heat transfer elements 17, thus making the fluid between the heat transfer elements 17 warmer and lighter which then will be replaced by heavier colder fluid thus creating turbulence and improving heat transfer. Further, the heat conductive material of elements 17 which is usually metal, is normally thin, and thus the heat resistance of said elements is low, and all of the heat transfer area is what is commonly known as primary heat transfer surface.

The unit of FIG. 3, has baffles to force the two fluids to pass through a convoluted path near the heat transfer surfaces. Since all the fluid usually passes through these spaces between baffles and heat transfer elements, spaces between such baffles and elements must be made large enough for the fluid volume. These larger spaces may necessitate use of vanes as shown by 43 and 44 and also by 36 and 37, to control fluid movements and force the fluid to follow the rotating heat exchanger. Also, one may use thermal insulation in manner shown, to improve the flow of the fluids, by utilizing density changes in the fluids. Thus, it is possible, by use of insulation, and vanes radially, to reduce or eliminate losses within the heat exchanger passages. Also, depending of the temperature differentials available between the two fluids, there may be some pressure gain for the fluids within the heat exchanger, especially if high rotational speeds are used.

The two fluids are shown in the drawings to be in counterflow. Parallel flow may also be used, if desired. Also, various entry and exit arrangements for the two fluids into and out of the heat exchanger, may be used. Further, in some arrangements, it may be desirable to have the heat exchanger elements 17 and 33 to be tapered, so that the elements change diameter in the axial direction. Such tapering has not been shown in the drawings, as it would be possible for anyone to do it, if desired. Also, the heat transfer elements may be formed from sheetmetal with radial corrugations, to provide radial obstructions equal to vanes. The baffles also may be similarly corrugated, forming radial passages similar to those formed by radial vanes.

For most applications, the rotational speed of the heat exchanger need not to be high. However, when desired, by constructing the housing and other parts sufficiently heavy, high speeds can be used. The operation and function of the heat exchanger components at high speeds is similar to that hereinbefore described.

Various other types of heat exchange member constructions may be used, if desired, in lieu of the bellows-like heat exchange members, such as finned tubing arranged in various ways, also radial discs stacked axially with spacers to form a finned member with fins on both sides similar to a finned tube with fins both inside and outside, and also heat pipes arranged to be in heat exchange relationship with both fluids. In all such arrangements, centrifugal force would be employed to assist in circulation of the two fluids and to improve heat transfer by creating turbulent conditions. Also, the vanes may be omitted in the form of FIG. 3, and vanes may be used with the form of FIG. 1. Further, the vanes 15 and 19 may be made in different radial lengths, to provide pumping action for the fluid thus eliminating the need for an external circulator, and similarly vanes 42 and 51 may be made in different radial lengths, as well as vanes 43 and 44, and vanes 36 and 37. By making the upstream vane longer, than the downstream vane, pressure is generated, thus pushing the fluid through the heat exchanger. Also, vanes may be curved in conventional manner if desired, to provide for fluid flow through the heat exchanger.

What I claim is:
1. A heat exchanger comprising:
 a. a support for shaft;
 b. a shaft rotatably mounted on said support;
 c. a heat exchanger housing mounted on said shaft to rotate therewith, said housing having an entry and an exit for a first fluid and an entry and an exit for a second fluid, a first fluid and a second fluid within said housing, a heat exchanger element within said housing to exchange heat between said first fluid and said second fluid, with said heat exchanger element separating said first fluid and said second fluid, said heat exchanger element being a convoluted bellows type member with the folds of the bellows being transverse to the housing shaft said bellows type member having radially outwardly extending heat conductive members alternately connected at their outward ends to form a first set of folds and connected at their inward ends to form a second set of folds, said first and second set of folds forming a continuous fluid tight heat exchanger element separating the two fluids, said first set of folds being open inwardly toward the heat exchanger center and filled by one of said fluids, said second set of folds being open outwardly toward the housing and filled by one of said fluids, with the first and second fluids being on opposite sides of said heat exchanger element and within the folds of the convoluted bellows, with centrifugal force assisting in the circulation of the fluids within the folds due to density differentials provided by heat transfer through the heat conductive heat exchanger members.

2. The heat exchanger of claim 1 wherein the first fluid is on the outward side nearer to the periphery of said heat exchanger housing and wherein said first fluid is warmer than said second fluid.

3. The heat exchanger of claim 1 wherein said heat exchanger element is provided with a baffle transverse to the shaft of said heat exchanger and located between convolutions of the convoluted member to guide the fluid past the surfaces of the convoluted member.

4. The heat exchanger of claim 3 wherein the baffle is provided with a first means for assuring that said first fluid will rotate with said heat exchanger element.

5. The heat exchanger of claim 4 wherein the baffle is provided with a second means for assuring that said second fluid will rotate with said heat exchanger element.

* * * * *